3,297,162
FLUID FILTER WITH EXTENDED
SERVICE LIFE
Herman C. Mouwen, Elberon, N.J., assignor to Purolator Products, Inc., Rahway, N.J., a corporation of Delaware
Filed Sept. 4, 1963, Ser. No. 306,452
3 Claims. (Cl. 210—132)

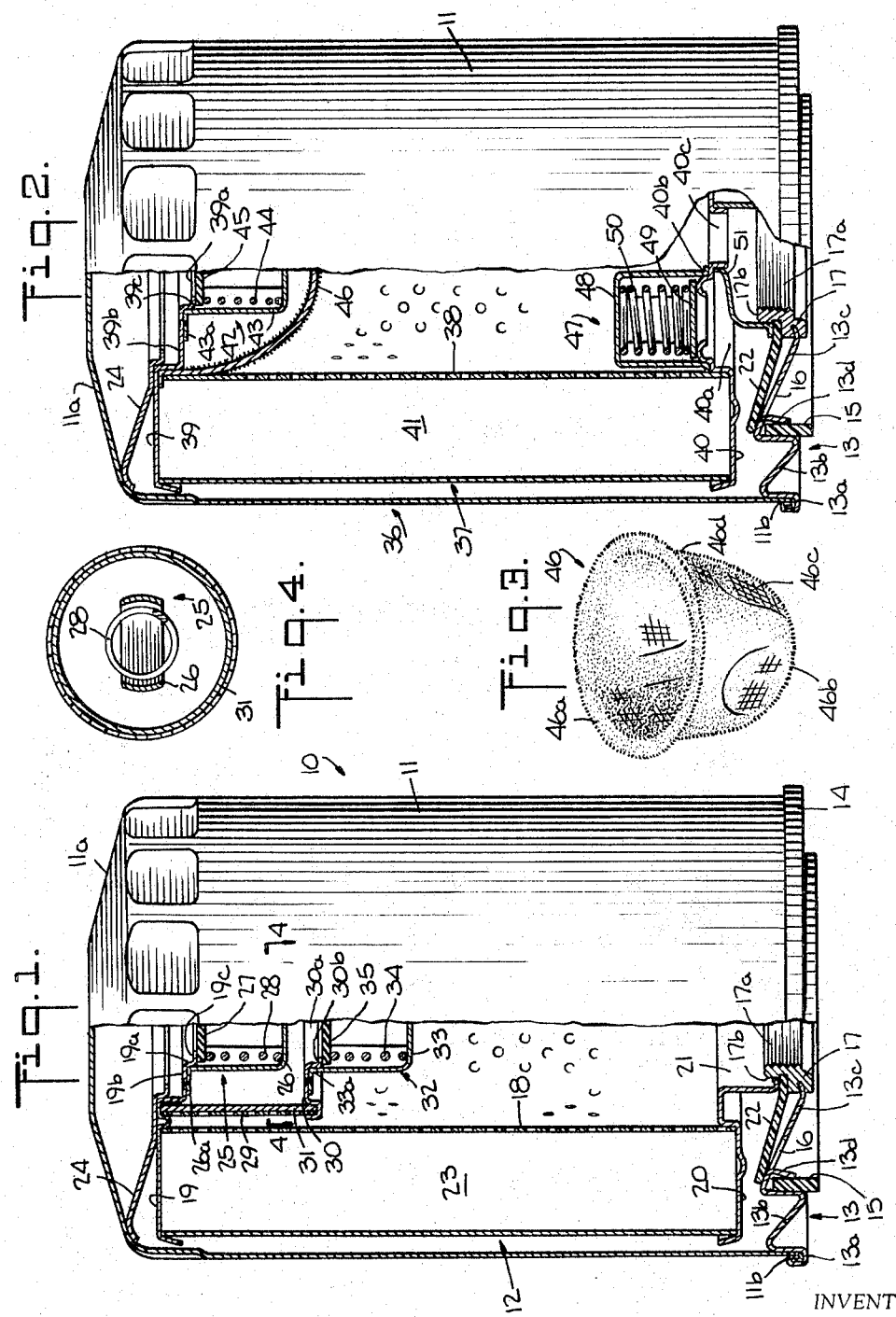

The invention relates to a fluid filter device having an extended service life and more particularly to a fluid filter device in which a portion of the flow through the filter element is bypassed through an additional filter element in response to fluid pressure in the filter device.

Internal combustion engines of the type used in the automotive field are commonly provided with filters for removing contaminants from the engine lubricating oil. In current practice the filters are generally of the "full-flow" type in which the oil discharged from the engine lubricating oil pump passes through the filter and then passes into the lubricating system of the engine. In many applications, the filter element is of the paper-type in which the contaminants are deposited on the surface of the paper as the oil passes through the element. In order to increase the surface of the element available to receive the contaminants, the paper is arranged in the form of pleats which extend in a radial manner within the filter casing. Filters including those of the paper-type are generally provided with relief valves in order to insure a flow of oil to the engine under all conditions. Thus whenever the flow of oil is sufficiently obstructed by the filter element and the pressure across the filter element reaches a predetermined level, a pressure responsive relief valve opens and thereby insures that the flow of oil to the engine is maintained.

During the service life of a filter of the paper-type, the filter element is gradually coated with the contaminants that are removed from the oil with the result that a dirt layer or filter cake accumulates upon the surface of the element. The filter cake increases the resistance to flow through the filter element so that for a given flow rate, the pressure drop across the element increases. Whenever the pressure drop increases to the predetermined level at which the relief valve opens, the relief valve bypasses a portion of the flow of oil through the filter so that unfiltered oil is delivered to the engine.

Tests have shown that the increase in the pressure drop across the filter element does not change at a substantially constant rate up to the level of the relief valve setting. Instead after the accumulation of an initial filter cake accompanied by an intermediate level of pressure drop, the pressure drop subsequently increases in a more rapid manner. It would appear that after the initial filter cake has accumulated, the pressure drop compresses the filter cake and results in the rapid increase in the pressure drop thereafter.

It is an object of the invention to increase the service life of a filter element prior to the point at which the relief valve opens.

It is another object of the invention to retard the increase in the pressure drop across the filter during its service life.

It is an additional object of the invention to retard the compressing of the filter cake with respect to the filter element during the earlier portion of the service life of the filter.

It is a further object of the invention to delay the point at which unfiltered oil can be passed by the filter device.

In one embodiment of the invention means are provided for filtering a flow of fluid from the inlet opening to the outlet opening of the filter device. Means are also provided for bypassing at least a portion of the flow with respect to the filtering means in response to a predetermined pressure drop across the filtering means. Additional means are provided for filtering the portion of the flow passing through the bypassing means. With this arrangement flow passes through the filtering means until the predetermined pressure drop is reached. Beyond that point, at least a portion of the flow passes through the bypassing means and an additional filtering means in order to insure that the rate of increase of pressure drop across the filtering means does not increase rapidly and also to insure that all of the flow is filtered.

In another embodiment of the invention in addition to the filtered bypassing means there is provided an additional bypassing means responsive to another predetermined pressure drop that is greater than the pressure drop at which the filtered bypassing means responds. The additional bypassing means insures that flow is maintained after both filtering means have accumulated a filter cake.

In an additional embodiment of the invention the filtered bypassing means as well as the additional bypassing means receive flow from the inlet side and deliver flow to the outlet side of the filter device.

In a further embodiment of the invention, the filtered bypassing means receives flow from the inlet side and delivers it to the outlet side while the additional bypassing means receives flow for the filtered bypassing means and delivers it to the outlet side of the filter.

These and other objects and advantages of the invention will more fully appear in the following detailed description taken in conjunction with the accompanying drawings in which:

FIG. 1 is a fragmentary vertical section view showing the filtered bypassing means and the additional bypassing means adjacent to one another;

FIG. 2 is a fragmentary vertical section view showing the filtered bypassing means and the additional bypassing means disposed at opposite ends of the filter device;

FIG. 3 is a perspective view of the filter element used in conjunction with the filtered bypassing means; and FIG. 4 is a fragmentary horizontal section view taken along line 4—4 in FIG. 1 and showing a portion of the filtered bypassing means.

Filter device 10 includes casing 11 having a cylindrical form and provided with closed end portion 11a and open end portion 11b (FIG. 1). Filter element 12 is disposed in the interior of casing 11. With the filter element in place within the casing, the casing is closed by means of end plate 13 which is secured about its periphery 13a to open end portion 11b of the casing by means of rolled seam 14.

End plate 13 includes circular convolutions 13b and 13c which are concentrically positioned with respect to one another. Sealing ring 15 is secured in place on the end plate by means of tabs 13d which extend from convolution 13c. By punching tabs 13d from convolution 13c, inlet openings 16 are formed. Sealing ring 15 is adapted to seal filter device 10 with respect to the surface on the engine upon which the filter device is mounted. End plate 16 further includes bushing 17 containing outlet opening 17a. The threaded portion of the outlet passage can be engaged to a threaded coupling on the engine in order to connect the outlet passage thereto. In this way it can be seen that the inlet and the outlet passages can be segregated one from the other when the filter device is installed.

Filter element 12 includes perforated tube 18 which extends between end caps 19 and 20. End cap 20 is provided with neck 21 which engages end portion 17b of the bushing. Disc valve 22 having a circular form is fabricated from resilient material such as rubber. The disc valve in its free position bears upon convolution 13c adjacent the periphery of the valve and closes the area overlying inlet openings 16 to prevent draining of the filter device through openings 16 between periods of engine operation. Thus the disc valve is an anti-drainback device. Neck 21 serves to secure the disc valve in place with respect to bushing 17.

Filter element 12 can be of the paper-type having filter paper 23 in the form of a plurality of radially extending pleats similarly as shown in United States Patent 2,663,660, issued December 22, 1953, of R. R. Layte for "Method of Assembling Filter Elements." The pleats of paper extend radially from perforated tube 18 and between the end caps to which the pleats are retained by an adhesive or the like. Filter paper 23 serves as the filtering means which is disposed in the path of flow from the inlet openings to the outlet opening. Thus during engine operation oil is pumped into inlet openings 16, passes between inner surface of casing 11 and the outer portion of the pleated filter paper of filter element 12, and then flows inwardly through the filter paper and ultimately through the perforations of tube 18 toward the outlet opening. During the service life of the filter device the filter cake or dirt layer accumulates upon the outer surface of filter paper 23. This condition increases the resistance to flow and results in a pressure drop developing across the filter paper. The pressure drop increases as the filter cake builds up.

Flat spring 24 attached to end cap 19 serves to urge the filter element toward the end plate and thereby presses neck 21 against disc valve 22 adjacent bushing 17. End cap 19 further includes central opening 19a about which is mounted bypassing means or bypass valve 25. The bypass valve includes U-shaped support 26 (FIGS. 1 and 4) having flanges 26a spot-welded to inner flange 19b of the end cap. Support 26 extends about valve disc 27 which is urged into a closed position against valve seat 19c by means of spring 28.

Surrounding bypass valve 25 is perforated tube 29 which is attached at one end to end cap 19. End plate 30 is attached to the other end of perforated tube 29. Along the inner surface of perforated tube 29 there is disposed the additional means for filtering the portion of flow which can pass through the bypassing means, namely filter element 31 which is in a substantially cylindrical form. Filter element 31 can comprise filtering material such as papers of synthetic, inorganic or natural fibers or combinations of any of these. In addition filter element 31 can be formed as a molded fibrous structure of synthetic, inorganic or natural fibers or combinations thereof. The filter element can be impregnated with resin to impart rigidity, water resistance, heat resistance and strength.

Additional bypassing means or relief valve 32 which is similar to the arrangement of bypass valve 25 is mounted about central opening 30a of end plate 30. The relief valve includes U-shaped support 33 having flanges 33a spot-welded to end plate 30. Support 33 extends about valve 35 which is urged against valve seat 30b in the closed position by means of spring 34.

During operation as the filter cake accumulates upon filter paper 23 of the filter element, the pressure drop across the element increases. At a predetermined pressure drop across the filter element, the pressure of the oil applied to valve disc 27 develops a force sufficient to overcome the predetermined force of spring 28 with the result that valve disc 27 begins to open. The pressure sufficient to cause the beginning of the opening of valve disc 27 can correspond to the pressure drop across element 12 which occurs adjacent to the point at which the pressure drop begins to increase at a more rapid rate. By opening valve disc 27, a portion of the flow is bypassed through filter element 31. The exposing of the area of filter element 31 to flow serves to retard the pressure drop across filter element 12 from increasing to the point at which it tends to markedly compress the filter cake.

By way of example, spring 28 can be conditioned with a spring constant which enables valve disc 27 to begin to open at approximately 2.5 p.s.i.g. and to be fully opened at approximately 4.0 p.s.i.g. Beyond 2.5 p.s.i.g. the building up of the filter cake is distributed between the filter elements 12 and 31. Consequently the rate at which the increase in the pressure drop across element 12 takes place is varied until at least reaching the pressure at which bypass valve 25 is fully opened. After valve 25 is fully opened, the pressure drop continues to increase as the filter cake is further accumulated on both filter elements 12 and 31.

The introducing of the additional area of filter element 31 to the flow through the filter device extends the period of operation over which the pressure drop across filter paper 23 can be maintained beneath the level which tends to compress the filter cake into the filter paper and cause a rapid increase in the pressure drop. As engine operation continues with flow through filter elements 12 and 31, a condition will ultimately be reached at which point the drop across filter element 31 becomes sufficient to cause the opening of relief valve 32. Relief valve 32 which is similar in construction to bypass valve 25 includes U-shaped support 33 having flanges 33a attached to end cap 30 adjacent to central opening 30a. Spring 34 urges valve disc 35 against valve seat 30b in the closed position.

When bypass valve 25 is open and in communication with the side of filter paper 23 exposed to the inlet opening, the pressure drop across filter element 31 reflects the pressure drop across filter paper 23. The opening of relief valve 32 insures that a flow of oil is provided to the engine whether or not flow continues to pass through filter elements 12 and 31.

For a given installation the service life of the filter device is set to end prior to the point that the build up of the filter cakes could set up a pressure drop condition which would cause the opening of relief valve 32. Of course, during warm-up of the engine under very cold conditions and after the filter has accumulated a large amount of contaminant, it is possible that very viscous oil flowing through element 12 and even through element 31 can cause a sufficient pressure drop to open the relief valve, and pass unfiltered oil to the outlet opening. Here again the relief valve serves to insure that a flow of oil is delivered to the engine.

In another embodiment of the invention, filter device 36 includes filter element 37 enclosed within the casing. Perforated tube 38 extends between end caps 39 and 40. Pleated filter paper 41 is disposed between the end caps and extends radially from the perforated tube. The means for bypassing the filtering means of filter paper 41 is bypass valve 42 which is similar to bypass valve 25. Valve 42 is mounted adjacent to central opening 39a of the end cap. Support 43 which is U-shaped has its flanges 43a attached to central portion 39b of the end cap. Spring 44 within the valve housing urges valve disc 45 against seat 39c in the closed position.

At a predetermined pressure drop across filter element 37 which is somewhat less than the value at which a rapid accumulation of the filter cake begins, spring 44 becomes compressed by the pressure applied to valve disc 45 and flow begins to pass past the valve disc. To prevent the passage of unfiltered oil to the engine, the path of flow from bypass valve 42 is intersected by bypass filter element 46 which can be of a substantially conoidal or hemispherical form as shown in FIG. 3. The bypass filter element is provided with flange 46a which is engaged by one end portion of filter paper 41 when the pleats of the filter paper are secured to end cap 39 by the application of adhesive or the like. The bypass filter element can further include a plurality of flats 46b disposed about its surface. Filter element 46 can be fabricated from a variety of synthetic, inorganic or natural fibrous materials, molded, woven or non-woven, with or without resin impregnation, and with a range of porosities. By way of example filter element 46 can be formed from viscose rayon material 46c which is impregnated with a phenolformaldehyde resin or the like and covered with a woven cotton scrim 46d. The impregnated woven material serves to stiffen and provide a degree of structural strength to the bypass filter element. This can be augmented by the provision of metal screen.

After bypass valve 42 opens and engine operation continues, filter cakes continue to accumulate upon filter element 37 and bypass filter element 46 until the accumulation results in the approach of an excessive pressure drop across the filter element 37 which corresponds to the additonal predetermined pressure drop at which relief valve 47 is adapted to open. Relief valve 47 is similar in form to relief valve 25. End cap 40 is provided with opening 40a adjacent to which relief valve 47 is mounted. Relief valve 47 includes U-shaped support 48 disposed about valve disc 49 which is urged toward seat 40b by spring 50. Connector 51 which extends adjacent to valve 22 and end portion 17b of bushing 17 forms a conduit from inlet openings 16, through relief valve 47 and central opening 40c of filter element 37, to outlet passage 17a.

Upon a predetermined pressure drop across filter paper 41 which corresponds to the point at which filter element 37 and bypass filter element 46 have received a substantial filter cake, valve disc 49 opens and enables relief valve 47 to bypass both of the filter elements. In this way the relief valve insures that a flow of oil is delivered to the engine whether or not flow continues to pass through filter elements 37 and 46.

What is claimed is:

1. A filter element for filtering a flow of fluid with respect thereto comprising a tubular member having a plurality of apertures extending therethrough, a first filter means disposed about the side portion of said tubular member, one end portion of said tubular member being adapted for connection to a discharge passage, a first valve housing disposed adjacent the other end portion of said tubular member disposed opposite said one end portion, said first valve housing having a first opening in communication with the exterior of said first filter means and the interior of said first valve housing, a first pressure responsive valve mounted within said first valve housing adjacent said first opening therein, said first valve normally closing said first opening and being responsive to a predetermined pressure drop across said first filter means for bypassing at least a portion of said flow with respect thereto through said first valve housing, a second filter means extending about said first valve housing for filtering said portion of said fluid being bypassed by said first valve into said tubular member, said second filter means having a second opening in communication with said first valve, a second valve housing extending adjacent said second opening, said second valve housing having a third opening therein, and a second pressure responsive valve mounted within said second valve housing adjacent said third opening, said second valve normally closing said third opening and being responsive to an additional predetermined pressure drop across said second filter means for bypassing into said tubular member at least a fraction of said portion of flow with respect thereto to relieve the pressure drop across said first filter means and said second filter means, whereby the opening of said second valve enables at least a fraction of said portion of flow bypassing said first filter by flowing through said first opening to flow serially through said second opening into the interior of said tubular member.

2. A filter element for filtering a flow of fluid with respect thereto comprising a tubular member having a plurality of apertures extending therethrough, a first filter means disposed about the side portion of said tubular member, one end portion of said tubular member being adapted for connection to a discharge passage, a first valve housing extending from the other end portion of said tubular member disposed opposite said one end portion and into the interior thereof, said first valve housing having a first opening in communication with the exterior of said first filter means and the interior of said first valve housing, a first pressure responsive valve mounted within said first valve housing adjacent said first opening therein, said first valve normally closing said first opening and being responsive to a predetermined pressure drop across said first filter means for bypassing at least a portion of said flow with respect thereto through said first valve housing, a second filter means disposed within said tubular member and extending about said first valve housing for filtering said portion of said fluid being bypassed by said first valve, said second filter means having a second opening in communication with said first valve, a second valve housing extending within said tubular member from adjacent said second opening, said second valve housing having a third opening therein, and a second pressure responsive valve mounted within said second valve housing adjacent said third opening, said second valve normally closing said third opening and being responsive to an additional predetermined pressure drop across said second filter means for bypassing into said tubular member at least a fraction of said portion of flow with respect thereto to relieve the pressure drop across said first filter means and said second filter means, whereby the opening of said second valve enables at least a fraction of said portion of flow bpyassing said first filter by flowing through said first opening to flow serially through said second opening to the interior of said tubular member.

3. A filter element for filtering a flow of fluid with respect thereto comprising a tubular member having a plurality of apertures extending therethrough, a first filter means disposed about the side portion of said tubular member, one end portion of said tubular member having a passage adapted for connection to a discharge conduit, a first valve housing disposed in the other end portion of said tubular member disposed opposite said one end portion, said first valve housing having a first opening in communication with the exterior of said first filter means and the interior of said first valve housing, a first pressure responsive valve mounted within said first valve housing adjacent said first opening therein, said first valve housing normally closing said opening of said first valve housing and being responsive to a predetermined pressure drop across said first filter means for bypassing at least a portion of said flow with respect thereto through said first valve housing, a second filter means disposed within said tubular member and extending between said first valve housing and the interior of said tubular member for filtering said portion of said fluid being bypassed by said first valve, a second valve housing mounted within said one end portion of said tubular member adjacent said passage which is adapted for connecting to a discharge conduit, said second valve housing having a second opening therein in communication with the interior of the said tubular member, and a second pressure responsive valve mounted within said tubular member adjacent said second opening of said second valve housing, said second valve normally closing said second opening of said second valve housing and being responsive to an additional predetermined pressure drop across said second filter means to bypass at least a fraction of the incoming flow with respect to said first and second filter means to relieve the pressure thereacross, whereby the opening of said second valve enables at least a fraction of the incoming flow to bypass said first and second filter means by flowing parallel therewith through said second opening into the interior of said tubular means.

References Cited by the Examiner

UNITED STATES PATENTS

| | | | |
|---|---|---|---|
| 2,617,535 | 11/1952 | Hamilton | 210—132 |
| 2,888,141 | 5/1959 | Coates et al. | 210—440 |
| 2,998,138 | 8/1961 | Mould et al. | 210—132 X |
| 3,000,506 | 9/1961 | Hultgren | 210—133 |
| 3,036,711 | 5/1962 | Wilhelm | 210—130 |

REUBEN FRIEDMAN, *Primary Examiner.*

J. DECESARE, *Assistant Examiner.*